(12) United States Patent
Peterson et al.

(10) Patent No.: US 7,047,562 B2
(45) Date of Patent: May 16, 2006

(54) CONDITIONING OF THE EXECUTION OF AN EXECUTABLE PROGRAM UPON SATISFACTION OF CRITERIA

(75) Inventors: Atley Padgett Peterson, Orlando, FL (US); Xiang Gao, Collegeville, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 846 days.

(21) Appl. No.: 09/886,302

(22) Filed: Jun. 21, 2001

(65) Prior Publication Data

US 2002/0199115 A1   Dec. 26, 2002

(51) Int. Cl.
G06F 11/30 (2006.01)
G06F 12/14 (2006.01)
H04L 9/32 (2006.01)

(52) U.S. Cl. .............................. 726/14; 726/1; 726/14; 726/15; 713/156; 713/175

(58) Field of Classification Search ................ 713/189, 713/159, 167, 200, 176, 187, 156, 175; 380/255, 380/251; 726/1, 14, 15
See application file for complete search history.

(56) References Cited

U.S. PATENT DOCUMENTS

| | | | | |
|---|---|---|---|---|
| 5,361,359 | A * | 11/1994 | Tajalli et al. | 713/200 |
| 6,154,839 | A * | 11/2000 | Arrow et al. | 713/154 |
| 6,173,399 | B1 * | 1/2001 | Gilbrech | 713/153 |
| 6,292,569 | B1 * | 9/2001 | Shear et al. | 380/255 |
| 6,367,012 | B1 * | 4/2002 | Atkinson et al. | 713/176 |
| 6,505,343 | B1 * | 1/2003 | Menon et al. | 717/116 |
| 6,584,508 | B1 * | 6/2003 | Epstein et al. | 709/229 |
| 6,658,571 | B1 * | 12/2003 | O'Brien et al. | 713/200 |
| 6,684,329 | B1 * | 1/2004 | Epstein et al. | 713/150 |
| 2001/0025346 | A1 * | 9/2001 | Kayashima et al. | 713/200 |
| 2002/0029350 | A1 * | 3/2002 | Cooper et al. | 713/200 |
| 2002/0099952 | A1 * | 7/2002 | Lambert et al. | 713/200 |
| 2002/0120776 | A1 * | 8/2002 | Eggebraaten et al. | 709/246 |
| 2002/0174358 | A1 * | 11/2002 | Wolff et al. | 713/200 |

OTHER PUBLICATIONS

Fraser et al., Hardening COTS Software with Generic Software Wrappers, May 9-12, 1999, Proceedings of the 1999 IEEE Symposium on Security and Privacy, pp. 2-16.*

* cited by examiner

*Primary Examiner*—Christopher Revak
*Assistant Examiner*—Shin-Hon Chen
(74) *Attorney, Agent, or Firm*—Duane Morris LLP

(57) ABSTRACT

Execution of an executable legacy or underlying program is controlled by a policy module. The policy enforcement agent (PEA) is an executable program including a header, an execution portion or program, and data. The PEA must be satisfied (the policy must be fulfilled) before the underlying program is executed. Separation of the PEA from the underlying program is rendered difficult by "encapsulating" the underlying program within the PEA. Encapsulation is accomplished by attaching the underlying module to the PEA, and amending the header of the PEA to conform to the combined program. The combined program is substituted for the original underlying program. The underlying program remains unchanged. When execution of the underlying program is invoked, the PEA executes and imposes its conditions. If the conditions are satisfied, the underlying program executes. In one embodiment, the underlying program generates a VPN tunnel, and the conditions imposed by the PEA include an active antivirus program and an active personal firewall.

8 Claims, 4 Drawing Sheets

CONDITIONING OF THE EXECUTION OF AN EXECUTABLE PROGRAM UPON SATISFACTION OF CRITERIA

FIELD OF THE INVENTION

This invention relates to arrangements for computer security, and more particularly for preventing the use of an executable program until some specific predetermined conditions are met. Particular application of the invention is made in security of an intranet or LAN in the presence of access by remote clients using virtual private network connections, and in public-key encryption.

BACKGROUND OF THE INVENTION

In the early 1990s, networks or local area networks (LANs) were used in offices, and the Internet was not widely used. Each LAN could be considered to be a closed or private intercommunication network to which the public had no access, so long as the workstations were kept in protected or secure locations and the interconnection lines or cables were not publicly accessible. In a LAN, each individual user or workstation was in communication with a server. If one of the workstations became infected with a virus, that virus, such as the "Jerusalem" virus, could infect the login.exe portion of server, which in turn would infect other workstations attempting to log onto the server after it became infected. A partial solution to the problem of viruses was to provide each workstation with its own antivirus program. This solution was imperfect, because the antivirus program could be turned off by the user of the workstation, and because the antivirus program could become out-of-date by virtue of not being updated with the latest virus information. A further improvement in addressing the problem of viruses in a LAN context was in associating a virus-identifying script file to the login process of the server.

The script file would execute each time a workstation attempted to log onto the server. Once the existence of a virus was established by the script file of the server, the infected workstation could be taken off-line or denied access to the server, and the infected login.exe program on the server was automatically erased and replaced by a stored, clean version. Operation could then continue as before, with the uninfected workstations accessing the server. If the infected workstation again attempted to log on, it would again be cut off. Eventually, maintenance personnel would examine the infected workstation and disinfect it.

In later improvements of the LAN, the login process of the server would, when a workstation attempted to log onto the server, use a script file to call or invoke the antivirus component or program of the workstation, thereby running the antivirus program in the workstation. The server would continue the logon of that particular workstation only if the workstation antivirus program returned an error level 0 signal, indicating that the workstation was clean or uninfected.

The advent of the Internet established widespread use of peer-to-peer communication among workstations or computers. In such peer-to-peer communication, the peer-to-peer structure does not allow for scripting, so an antivirus policy including running an antivirus program cannot be directly enforced, and thus there is no way for one of the workstations or computers to require execution of an antivirus program as a precondition to access to the Internet by another workstation. As a result, a workstation which became infected with a virus while connected to the Internet could, when connected to the intranet or LAN, spread the infection.

With the advent of access by way of the Internet, viruses are generally spread by email, which continues to have a client-server structure, notwithstanding the underlying peer-to-peer structure of the Internet itself. In effect, the workstation has become the "server" as to the virus, and can spread the virus to all its peers, mostly by email, but also by network shares, such as network directories.

Authentication of an Internet user attempting to access the Internet was confined to user name and password, and no authentication of the connecting platform is done. Thus, users communicating from unprotected and exposed remote sites could become infected at those remote sites and then readily spread the viruses internally to the intranet or LAN.

In order to expand the utility of LANs when the Internet became available, one or more "gateways" were connected to each LAN or intranet, which resulted in communications between the closed or private intranet and the public Internet. The server which provided the gateway received communications from the Internet in only a few protocols, so it was practical to provide antivirus programs in the gateway servers to keep the intranet "clean" or to protect it from viruses. It continued to be advisable to maintain virus protection programs operating at each workstation or client of an intranet, to take care of any viruses incidentally introduced by way of infected diskettes. The limited number of gateways or entryways between the Internet and each intranet allowed reasonable virus control, because, with a limited number of gateways, their antivirus programming could be changed in a relatively short time to adapt to a spreading virus in the Internet. By contrast, if intranet protection depended solely on the antivirus programs running in each client workstation, tens or hundreds of thousands of client workstations might need to be reprogrammed in a large intranet, which could not be accomplished in a short period of time.

With the advent of virtual private network (VPN) use, pathways or "tunnels" through the Internet have become available which provide a "direct" communication path or link between a remote client workstation (remote as to the intranet to which it connects) and the intranet providing such VPN access. The tunnel is a pathway through the Internet which is protected by encryption, and so is effectively private, even though the tunnel passes through a public cyberspace. While the intranet still requires a remote access server at a gateway in order to encrypt and decrypt information traversing a VPN, the large number of possible data formats or protocols which might be communicated over such a path makes it difficult or impossible to provide proper virus protection by use of currently available remote access servers.

The advent of VPNs for use with intranets presents various problems, which include the fact that the remote client workstation is physically removed from or outside the physically protected space associated with the intranet, and may therefore be vulnerable to use by other than the authorized user, but this problem can largely be controlled by requiring passwords to allow use of the remote workstation only by authorized personnel. However, there are additional problems relating to the workstation itself. Among these problems is that the remote client workstation is presumably used for purposes other than communication with the intranet, as for example such a workstation might be used to access the user's email on the Internet. Such access does not have the benefit of filtration by a gateway server as it would if the workstation were inside an intranet, which gives rise to the possibility that the remote workstation might become infected with a virus if its antivirus program happens to be turned off or out-of-date. This would be of little concern, except that such a remote client workstation is treated as a part of the "clean" intranet when it communicates therewith by way of a tunnel. A virus against which the antivirus protection of some, or all, of the workstations of an intranet is ineffective could spread within the intranet, even if the gateways provided between the Internet and the intranet were capable of handling the virus. Such a situation could result in the intranet becoming unusable until a large number or all of the workstations were disinfected, which could be a very long time for large intranets.

In one large intranet, several hundred instances of the Anna Kounikova virus on the intranet were traced to remote VPN users. The remote users had become infected by use of their email on the Internet, and communicated the virus to the intranet through the direct VPN path. The rapidly expanding use of VPNs makes massive infection of intranets more likely.

SUMMARY OF THE INVENTION

In general, execution of an executable legacy or underlying application program is controlled, according to an aspect of the invention, by a policy enforcement module or policy enforcement agent. The policy enforcement agent (PEA) is an executable program including a header, an execution portion or program, and data. The PEA must be satisfied (the policy must be fulfilled) before the underlying program is executed. Separation of the PEA from the underlying program is rendered difficult by "encapsulating" the underlying program within the PEA. Encapsulation is accomplished by attaching the underlying module to a data location of the PEA, and amending the header of the PEA to conform to the resulting combined program. The combined program is substituted for the original underlying program. The underlying program remains unchanged, except for its attachment to the PEA. In one mode of the method of the invention, the underlying executable program is simply appended to the PEA. When execution of the underlying program is invoked, the PEA executes and imposes its conditions. If the conditions are met, the underlying program is executed. In one embodiment, the underlying program, when executed, generates a VPN tunnel, and the conditions imposed by the PEA before the underlying program can execute include the presence of an active antivirus program and an active personal firewall.

More particularly, a security method for allowing use of a program includes the step of procuring a software executable policy enforcement agent which, when invoked, imposes one or more conditions on successful execution or termination, and which, when successfully executed or terminated, invokes execution of an executable existing program. A preexisting or underlying executable program is procured, the use or execution of which is to be made subject to the conditions. The preexisting or underlying program is encapsulated with the policy enforcement agent without changing the preexisting program, to thereby produce a combined program. The combined program is substituted for the preexisting program, so that the policy enforcement agent executes instead of the preexisting program when the preexisting program is invoked. When execution of the preexisting program is desired, the preexisting program is invoked, whereby, or as a result of which, the policy enforcement agent portion of the combined program executes. The conditions imposed by the control module are then satisfied, whereby the preexisting program executes. Of course, if the conditions are not satisfied, execution of the policy enforcement agent terminates unsuccessfully, and the underlying executable program is not invoked. In one mode of the method of the invention, the substituting step includes the step of amending the header of the policy enforcement agent portion of the combined program to match the characteristics of the combined program.

In a particular version of the method according to the invention, policy enforcement in relation to a preexisting executable program includes the step of generating a software control element which is identifiable to a host operating system as an executable program and which includes an execution component for executing the preexisting executable program, and which also contains a set of conditions which must be met in order to invoke the execution program. The software control element is combined with the preexisting executable program, to form a combined program in which the header is that of the software control element. The combined program is substituted for the preexisting executable program. When execution of the preexisting executable program is desired, execution of the combined program is commanded, to thereby execute the software control element, and satisfying the conditions so that the preexisting executable program executes. In a particular version of this method according to the invention, the conditions include current execution or running of an antivirus program. Another condition may be the operation of a personal firewall. In a more particular version, the preexisting executable program, when executed, generates a VPN tunnel. In another version, the underlying executable program relates to public-key encryption, and the policy requires the existence of an acceptable digital certificate.

DESCRIPTION OF THE INVENTION

Figure 1:
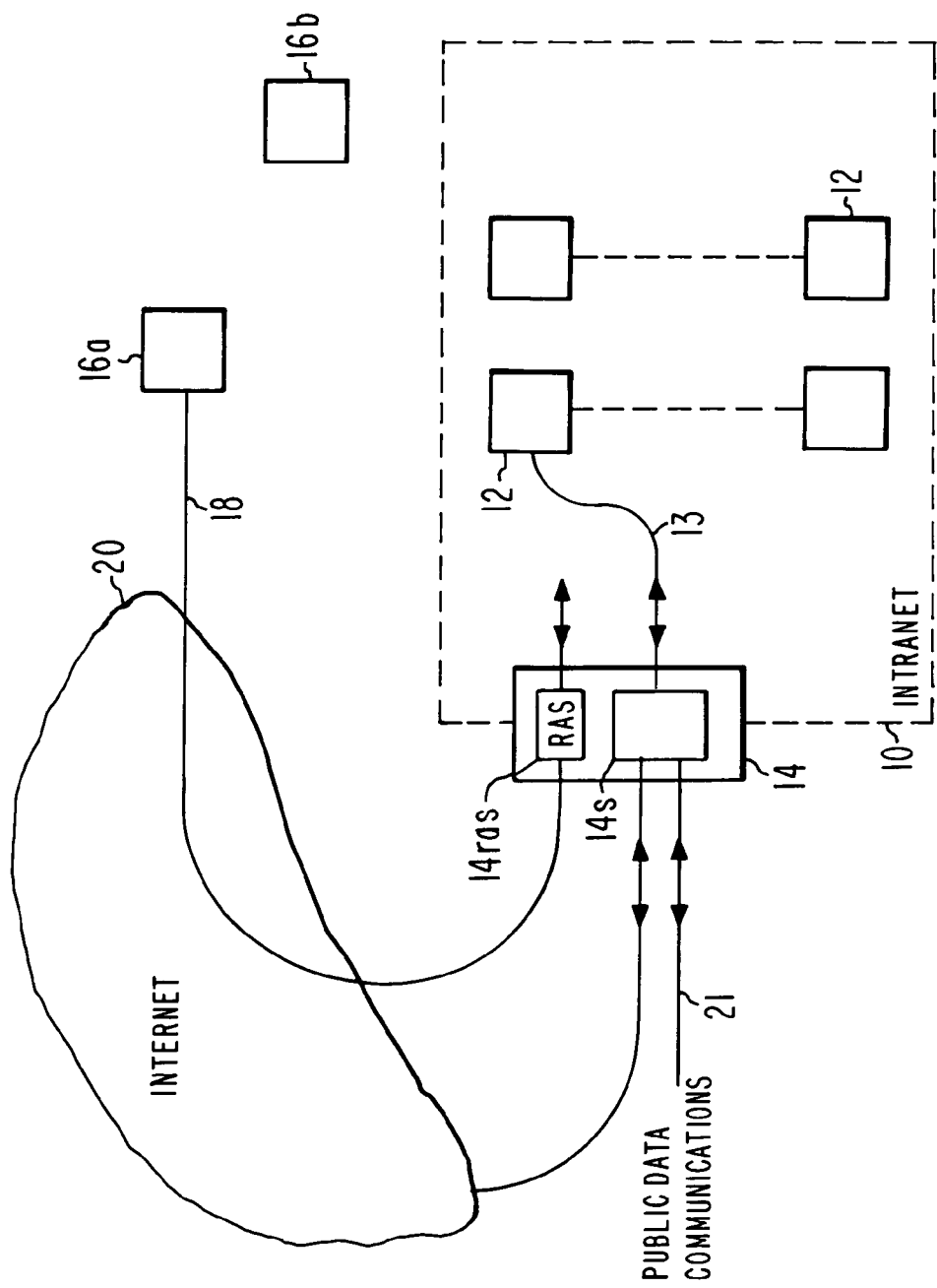
FIG. 1 is a simplified block diagram illustrating the environment in which one aspect of the invention is used.

In FIG. 1, an intranet 10 includes a plurality of workstations or clients, some of which are designated as 12. The client workstations 12 may or may not be at a common physical location. For example, one large intranet has more than 100,000 client workstations distributed over 160 or more individual controlled sites. Such sites are physically protected, requiring personal identification for access. In many cases, access to the workstations themselves are protected only by passwords, to limit their use to authorized individuals. Access to many functions of the intranet may be available from a workstation without an additional password. However, access to critical or sensitive information on the intranet is limited to those with the proper personal identification and password. In FIG. 1, the intranet 10 includes workstations 12 which are connected to each other by paths, one of which is designated as 13, which are private, in that they are not readily accessible to unauthorized persons.

In the arrangement of FIG. 1, access between the intranet 10 and the outside world is by way of one or more controlled gateways, the illustrated one of which is designated as 14. Gateway 14 may include one or more servers 14s, which interface with the external Internet 20 and, by way of one or more paths 21, with other public communication channels. The gateway servers 14s provide various services, including virus protection, for communications which pass therethrough.

In FIG. 1, a set 16 of various workstations lies external to the intranet 10. Some of these workstations are designated as 16a and 16b. Workstation 16a is illustrated as being connected, through the Internet, by a virtual private network (VPN) path 18, and by way of a remote access server (RAS) 14ras, to the interior of the intranet 10. Thus, the VPN path 18 bypasses portions of gateway 14, and communicates with the inside of the intranet 10 more or less directly. Setting up the VPN path 18 requires user identification by the operator of remote workstation 16a to the remote access server, but no workstation validation is required. Consequently, as to the external workstation 16a communicating by way of VPN path 18, no virus protection is available to the intranet if the workstation 16 should be infected.

Figure 2:
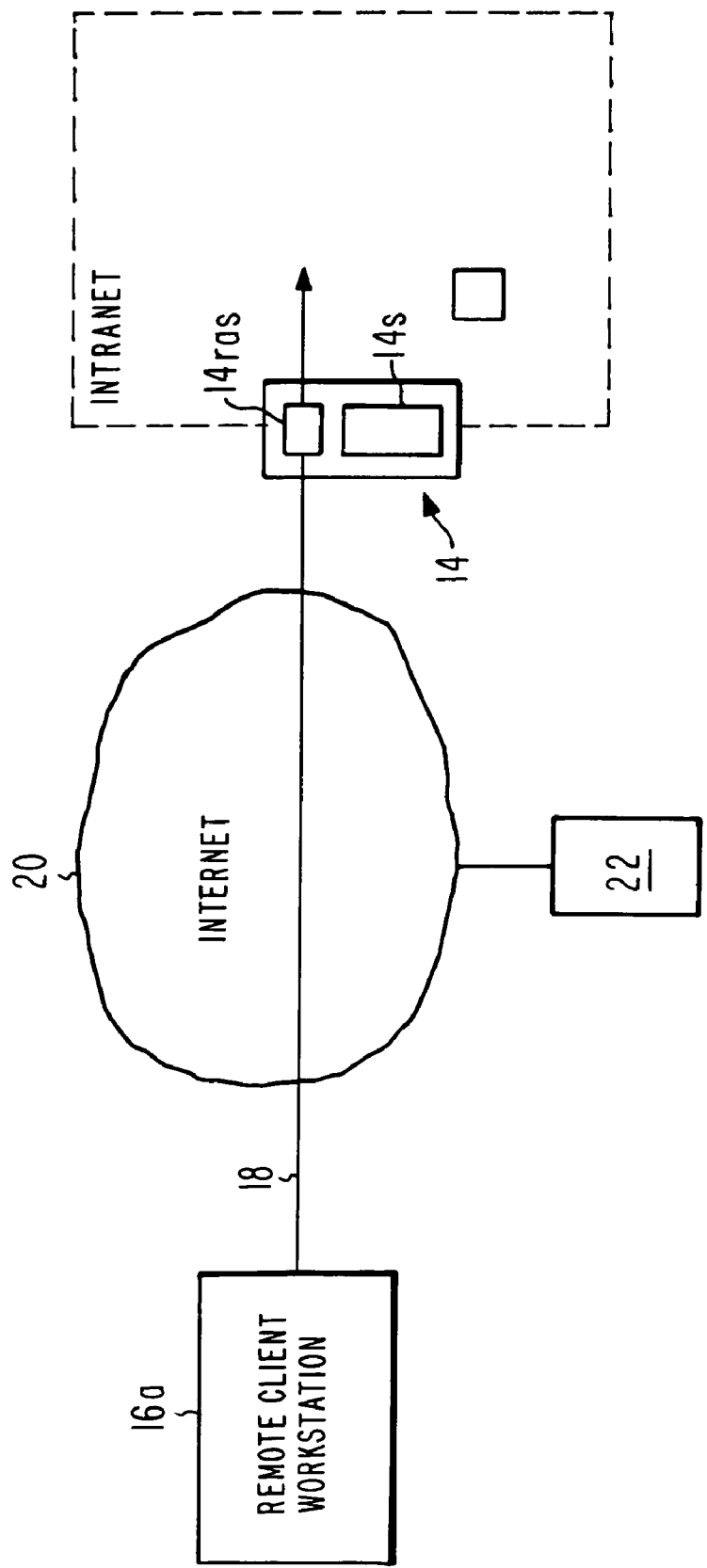
FIG. 2 is a simplified version of FIG. 1, illustrating a connection which might cause a remote workstation to become infected with a virus.

In FIG. 2, the system of FIG. 1 is reduced or simplified to a remote client workstation 16a connected on a virtual private network 18 through the Internet 20 to the remote access server portion 14ras of gateway 14, and through the remote access server portion 14ras to the intranet 10. Ordinarily, the client workstation 16 will be functionally connected to one or more of the workstations within the intranet 10, but it may simply be "sitting" as though it were another client workstation within the intranet, waiting for any messages which might be addressed thereto. The problem with this arrangement is that the VPN authentication mechanism associated with the remote access server 14ras authenticates the user of the remote workstation, but does not verify that the remote workstation itself is safe to connect to. If the remote user 16 of FIG. 2 accesses his personal email at an uncontrolled external site 22, the machine may become infected, and the infection may be passed to the intranet.

According to an aspect of the invention, the remote workstation 16a is required to complete execution of a policy enforcement module or policy enforcement agent (PEA) before the VPN is set up. The policy enforcement agent can enforce any desired policy, but in the described situation would involve verifying that the selected antivirus program is running, and possibly checking the antivirus program version, to assure that the proper version is available. In addition, it may be desirable to verify that a personal firewall is in operation on the remote client workstation, to prevent unauthorized connections thereto.

According to an aspect of the invention, a "control module" software program is generated, and the policies established by this control module must be executed before the virtual private network client program is permitted to execute. Thus, the control module must be satisfied that at least the antivirus program in the remote client workstation 16a is active in order for execution of the VPN-tunnel-forming software to execute. In order to prevent a user from separating the control module from the client program (in this case the VPN-tunnel former), the client program is "encapsulated" within the control module.

Figure 3:
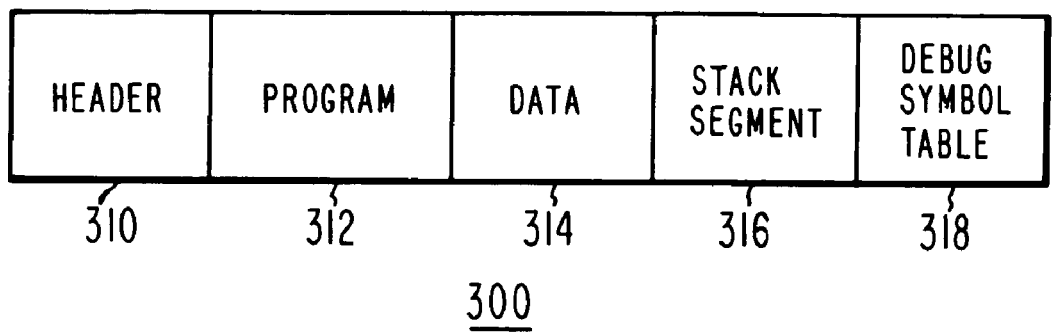
FIG. 3 is a simplified representation of the structure of an executable program for one kind of operating system.

FIG. 3 is a representation of the structure of a preexisting Windows-operating-system program executable VPN client program, which is the client program to be controlled in this case. At this time, such Windows PE executables are generally used for VPN format programs, although there is no reason that other operating systems and formats could not be used. Thus, the VPN client program of FIG. 3 must execute in order to generate the virtual private network path between the client and the intranet. In FIG. 3, the first portion of the program 300 is a header 310, which identifies to the host operating system the locations of the various portions of the program in the following data stream, and also includes information as to an offset at which to begin execution. Portion 312 is the executable program, and data portion 314, stack portion 316, and debug symbol table 318 together constitute data for use by the operating program 312. Execution of the program occurs when it is loaded into memory, and the operating system reads the header to determine the locations of the data elements and the offset, memory is allocated to the various data elements, and execution of the executable portion begins. In the case of a VPN-tunnel forming program, executable program section 312 of program 300 of FIG. 3 must execute.

Figure 4:
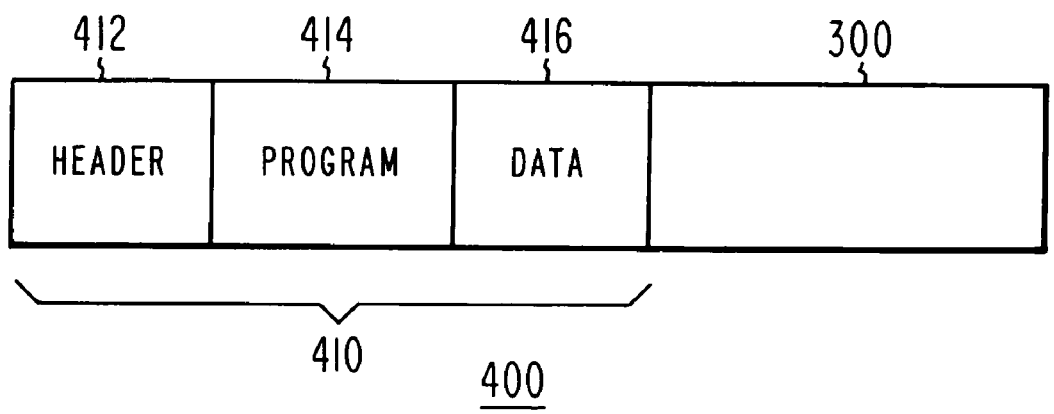
FIG. 4 is a simplified representation of the structure of an executable program such as that of FIG. 3 associated or "encapsulated with" an executable policy enforcement agent.

According to an aspect of the invention, the executable VPN client program 300 of FIG. 3 is combined with another program to control its execution, or more properly to impose conditions precedent to its execution. In FIG. 4, a software control module 410 is combined with or precedes the "preexisting" executable VPN client program 300 to form a combined program 400. The control module 410 includes a header 412, an executable program 414, and various data portions designated together as 416. In addition, VPN client program 300 may be viewed as being a further data portion of the combined program 400 including the control module 410. That is to say, that the VPN client program occupies a location identified in the header of combined program 400 as a data portion. Insofar as the host operating system is concerned, program 300 is "invisible" as an executable program. At the time at which the control module 410 is combined with the VPN client program 300, the header 412 identification is modified to include the identification of the VPN client program 300, including file size; failure to update the header may result in identification of the combined program as a virus by some antivirus programs. The combined program 400 is then saved, replacing the original VPN client program 300.

Figure 5A:
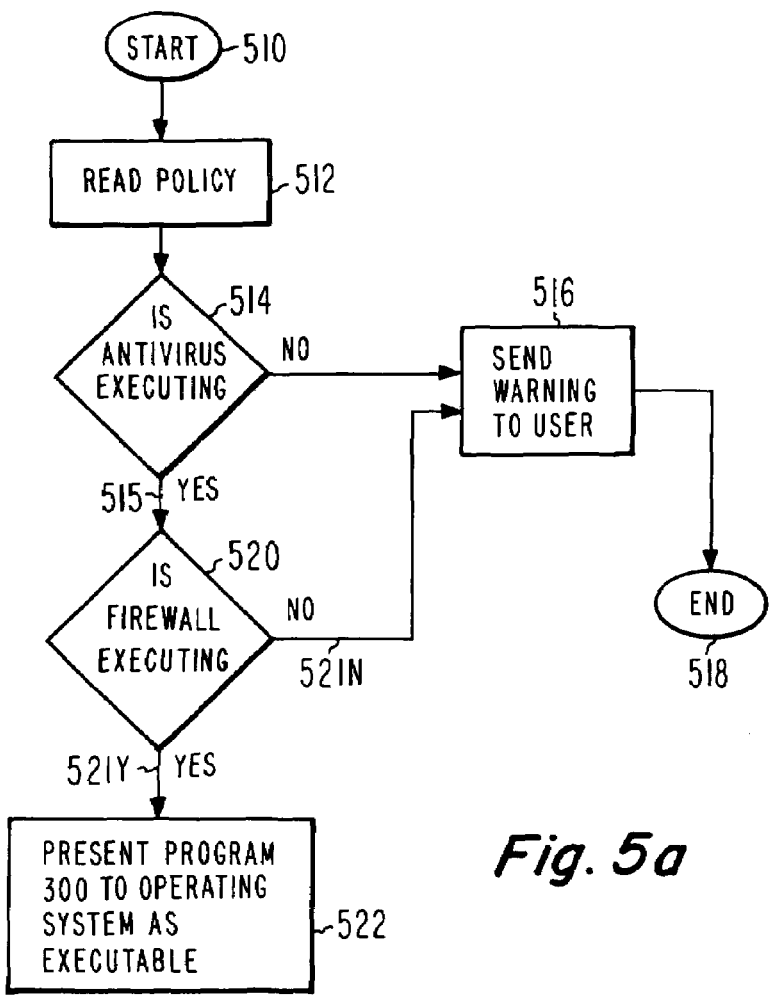
FIG. 5*a* is a simplified flow chart or flow diagram illustrating the logic of the executable policy enforcement agent.

FIG. 5a is a simplified flow graph or flow chart illustrating the operation of the control module program 414 of FIG. 4. In FIG. 5a, the logic begins at a START block 510 and flows to a further block 512, which represents the reading of the policy. In the present illustration, the policy is to verify that the antivirus program is running on the remote client workstation, and also that the client local firewall process is executing. From block 512, the logic flows to a decision block 514, which determines if the antivirus program is executing. If the antivirus program is not executing, the logic leaves decision block 514 by the NO output, and proceeds to a block 516, which represents the sending of a message to the client workstation monitor that the VPN cannot be formed, and possibly the reason therefor. At such time as the remote access server provides for such a function, block 516 may also cause a message to be sent to the remote access server indicating that the policy check has failed, and possibly for what reason. From block 516, the logic flows to an END block 518, representing a failure and termination of the VPN formation.

In FIG. 5*a,* if decision block 514 finds that the antivirus program is running, the logic leaves the decision block by the YES output, and proceeds to a further decision block 520. Decision block 520 determines if the local firewall is executing. If the local firewall is not executing, the logic leaves decision block 520 by the NO output, and proceeds by way of block 516 to the END block 518, to terminate VPN formation. If block 520 finds that the firewall is in place and executing, the logic proceeds by way of the YES output to a block 522. Block 522 represents the presentation of the remote client VPN tunnel forming program 300 to the operating system of the remote workstation 16*a* for execution. Thus, the client VPN tunnel forming program 300 executes when the control program conditions are met, to form the VPN path.

Figure 5B:
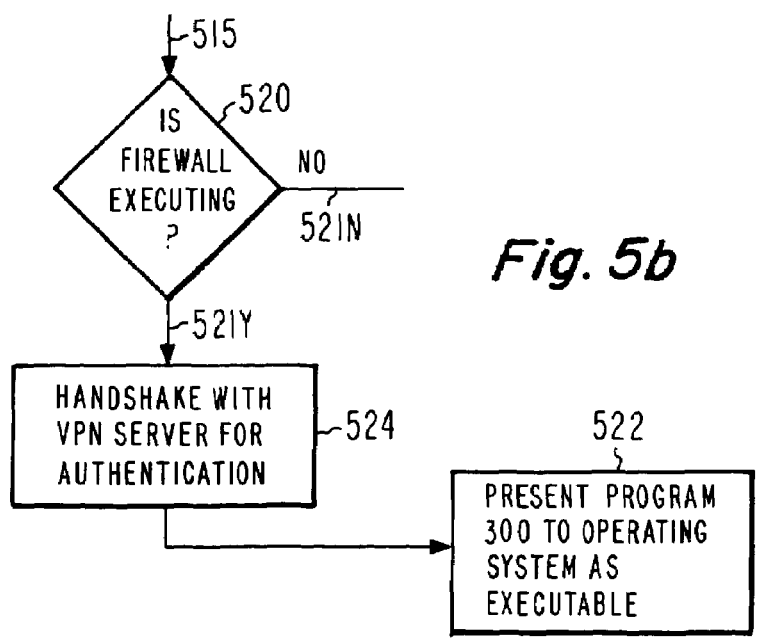
FIG. 5*b* is a simplified flow chart or flow diagram illustrating an alternative form for a portion of the flow of FIG. 5*a*.

FIG. 5*b* represents a portion of the arrangement of FIG. 5*a,* modified to illustrate one possible alternative logic. In FIG. 5*b,* once decision block 520 has determined that the local firewall is executing, and that the VPN is allowed to be formed, the logic proceeds to a block 524, which represents a handshaking between the local client and the remote VPN server, and transmission of a message to the remote VPN server that the control policy has been executed, and that the VPN which is about to be set up is authorized. From block 524 of FIG. 5*b,* the logic then flows to block 522, to present the VPN program 300 to the operating system for execution as described in conjunction with FIG. 5*a.*

In order to implement block 522 of FIG. 5*a* or 5*b,* the encapsulated program (program 300 of FIG. 4) is extracted by the operating system of the remote workstation 16*a* from the combined program 400, and saved or stored as a file on any medium from which the operating system can execute, as for example a disk. Execution is then spawned as a subprocess of the control module. The reason for using such a spawning is so that control returns to the control module 410 after execution, which then removes or deletes the extracted file, so that it is not available for a later launch of a VPN tunnel without running the policy enforcement agent. Such a type of execution is simple and straightforward.

Another, possibly more elegant method for executing the client VPN-tunnel-forming program 300 is manipulate the registers and operating system so that the image of the encapsulated program located in memory is recognized as an executable module and executed, and control is thereby transferred to the executable module 300 pursuant to its header information. Control still returns to the control module after execution. This method has the advantage of not requiring erasure of the extracted program 300, since there is no file be captured and reused to form the VPN tunnel.

Thus, in the described context, the VPN path is not formed by running the VPN tunnel forming program 300 unless the control protocol is satisfied, and the remote client workstation 16*a* cannot connect to the intranet 10 unless the conditions are satisfied. If the conditions include antivirus operation or firewall execution, the intranet is protected to the extent that such programs can provide protection. It should particularly be noted that the client VPN software has not been modified at all, but it has merely been made an adjunct to another program.

Another embodiment of the invention involves Public Key enablement of a legacy application or program created prior to availability of a public key infrastructure (PKI). A PKI-enabled application is able to accept a digital certificate in lieu of a normal username/password. Instead of a login, both user identification and authentication is contained in a file, which is the digital certificate. Application of the invention to this situation involves encapsulation of the legacy application in a policy enforcement agent. When the legacy application (or the policy enforcement agent) is invoked, the policy enforcement agent accepts, and then decodes/verifies the certificate. If the certificate is valid and the identity expressed by the certificate is authorized for use, the policy enforcement agent passes control to the legacy application together with authorization understandable to the legacy application.

Other embodiments of the invention will be apparent to those skilled in the art. For example, the operating system has been described as Windows, but could be any common operating system. While the underlying executable application has been described as simply being appended as data to the software control module, but the executable application may be placed at any desired data location within the software control module, and it may even be possible to break the executable application into different portions, separated from each other by other data portions of the software control module.

Thus, a security method for allowing (or preventing) use of an executable program (300) includes the step of creating or procuring a software executable policy control or policy enforcement agent (410) which, when invoked, imposes one or more conditions (514, 520) on successful operation, and which, when successfully operated, invokes execution (522) of an executable application or preexisting program (300). A preexisting or underlying executable program (300), the use of which is to be made subject to the conditions (514, 520), is created or procured. The preexisting or underlying program (300) is "encapsulated with" or "encapsulated within" the policy enforcement agent (410) without changing the preexisting program (300), to thereby produce a combined program (400). The combined program (400) is substituted for the preexisting program (300), so that the policy enforcement agent executes instead of the preexisting program (300) when the preexisting program (300) is invoked. When execution of the preexisting program (300) is desired, the preexisting program (300) is invoked, whereby the policy enforcement agent portion of the combined program (400) executes. The conditions (514, 520) of the control module are then satisfied, whereby the preexisting program (300) executes. Of course, if the conditions (514, 520) are not met, the policy enforcement agent terminates without invoking the underlying program (300). In one mode of the method of the invention, the substituting step includes the step of amending the header (412) of the policy enforcement agent portion (410) of the combined program (400) to match the characteristics of the combined program (400).

In a particular version of the method according to the invention, policy enforcement in relation to a preexisting executable program includes the step of generating a software control element (410) which is identifiable to a host operating system (such as, for example, Windows) as an executable program and which includes an execution component (522) for executing the preexisting executable program (300), and which also contains a set of conditions (514, 520) which must be met in order to invoke the execution component (522). The software control element (410) is combined with the preexisting executable program (300), to form a combined program (400) in which the header (412) is that of the software control element (410). The combined program (400) is substituted for the preexisting executable program (300). When execution of the preexisting executable program is desired, execution of the combined program (400) is commanded, to thereby execute the software control element (412). Satisfying the conditions (514, 520) results in execution of the preexisting executable program (300). In a particular version of this method according to the invention, the conditions (514, 520) include current execution of an antivirus program. In a more particular version, the preexisting executable program (300), when executed, generates a VPN tunnel (18). In another embodiment, the executable underlying application or program is one which is intended to be conditioned on receipt of authorization information in some format other than that of a conventional X.509 based digital certificate, or whatever form of digital certificate may currently be in widespread use. The policy enforcement agent encapsulates the executable application or program to form a combined program, and the program portion of the policy enforcement agent portion of the combined program accepts the current style of digital certificate (as, for example, the X.509-based certificate), reads and authenticates the certificate, and, if the certificate is valid, turns control over to the executable application. If needed, the policy control module also translates the authentication information into a form understandable to the executable application.

What is claimed is:

1. A security method for controlling use of an executable application, said method comprising the steps of:
   procuring a software executable policy enforcement agent which, when invoked, imposes one or more conditions on successful execution, and which, when successfully executed, invokes execution of said executable application;
   encapsulating said executable application with said policy enforcement agent without changing said executable application, to thereby produce a combined program;
   substituting said combined program for said executable application, so that said policy enforcement agent executes instead of said executable application program when said executable application is invoked; and
   one of (a) satisfying said conditions of said control module, whereby said executable application executes, and (b) not satisfying said conditions, whereby said executable application does not execute;
   wherein said software executable policy enforcement agent includes a header component, and said substituting step includes the step of amending said header component of said policy enforcement agent portion of said combined program to match the characteristics of said combined program.

2. A method according to claim 1, wherein said executable application includes a VPN-tunnel-generating application, and said step of satisfying said conditions includes the step of running an antivirus program.

3. A method according to claim 1, wherein said executable application includes a VPN-tunnel-generating application, and said step of satisfying said conditions includes the step of running an antivirus program having an acceptable update status.

4. A method according to claim 1, wherein said step of satisfying said conditions includes the step of running a personal firewall program.

5. A method according to claim 1, wherein said executable application accepts verification information in a format other than a digital certificate, and said step of satisfying said conditions includes the step of accepting a digital certificate.

6. A method according to claim 5, wherein said step of accepting a digital certificate includes the step of accepting an X.509 based digital certificate.

7. A method according to claim 5, further comprising the step of translating at least some information from said digital certificate into a form recognizable by said executable application.

8. A method for policy enforcement in relation to an executable application, said method comprising the steps of:
   procuring a software control element which is identifiable to a host operating system as an executable program and which includes an execution component for executing said executable application, and which also contains a set of conditions which must be met in order to invoke said executable application;
   combining said software control element with said executable application, to form a combined program;
   substituting said combined program for said executable application;
   commanding execution of said combined program, to thereby execute said software control element, whereupon said execution component is invoked if said conditions are met, and said executable application executes;
   wherein software control element includes a header identifying the locations of executable and data portions of said control element, and said step of combining said software control element with said executable application includes the steps of:
   appending said executable application to said software control element in a location identified by said software control element as a data location; and
   updating said header of said software control module to correspond with the characteristics of said combined program.

* * * * *